(12) United States Patent
Dellow

(10) Patent No.: US 8,600,061 B2
(45) Date of Patent: Dec. 3, 2013

(54) GENERATING SECURE DEVICE SECRET KEY

(75) Inventor: Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/168,911

(22) Filed: Jun. 24, 2011

(65) Prior Publication Data

US 2012/0328106 A1    Dec. 27, 2012

(51) Int. Cl.
*H04L 9/08* (2006.01)

(52) U.S. Cl.
USPC ............ 380/278; 380/277; 380/284; 380/285

(58) Field of Classification Search
USPC .......................... 380/285, 281, 284, 278, 277
See application file for complete search history.

(56) References Cited

U.S. PATENT DOCUMENTS

| | | | | |
|---|---|---|---|---|
| 6,868,495 B1 * | 3/2005 | Glover | .......................... | 713/190 |
| 6,980,660 B1 * | 12/2005 | Hind et al. | .................... | 380/282 |
| 7,779,262 B2 * | 8/2010 | Kim et al. | ..................... | 713/180 |
| 8,015,599 B2 * | 9/2011 | Popp | ................................ | 726/9 |
| 8,094,824 B2 * | 1/2012 | Hatano et al. | ................. | 380/284 |
| 8,316,237 B1 * | 11/2012 | Felsher et al. | ................. | 713/171 |
| 2002/0021804 A1 * | 2/2002 | Ledzius et al. | .................. | 380/44 |
| 2003/0095665 A1 * | 5/2003 | Wheeler et al. | ............... | 380/282 |
| 2009/0106551 A1 * | 4/2009 | Boren et al. | .................. | 713/158 |
| 2009/0254750 A1 * | 10/2009 | Bono et al. | ..................... | 713/170 |
| 2010/0027790 A1 * | 2/2010 | Vembu et al. | ................. | 380/210 |
| 2011/0047373 A1 * | 2/2011 | Karasawa et al. | ............. | 713/156 |

* cited by examiner

*Primary Examiner* — Krisna Lim
(74) *Attorney, Agent, or Firm* — Sterne, Kessler, Goldstein & Fox P.L.L.C.

(57) ABSTRACT

Methods, devices, systems and computer program products are provided to facilitate cryptographically secure retrieval of secret information that is embedded in a device. The embedded secret information can include a random number that is not custom-designed for any specific requestor of the secret information. Upon receiving a request for the embedded secret information, an encrypted secret is provided to the requestor that enables the recovery of the embedded secret information by only the requestor. Moreover, a need for maintenance of a database of the embedded secret information and the associated requestors is eliminated.

18 Claims, 7 Drawing Sheets

GENERATING SECURE DEVICE SECRET KEY

BACKGROUND

This patent document relates to security of information and security of a device, including techniques for exchanging secret information between different entities and generating secure device secret key.

Secure exchange and delivery of information among various devices are important in various applications involving securing information and certain devices. To this end, various security protocols and algorithms are available to enable secure exchange of information including voice, images, videos and other types of data amongst various entities. Data security protocols often rely on cryptographic techniques, such as encryption, digital signatures and hash functions, to allow authentication and exchange of information at the desired levels of security. These techniques often rely on a secret value (e.g., a secret key, a random value, etc.) that is used by one or more of the involved parties to establish a secure communication channel, to effectuate authentication protocols and the like.

DETAILED DESCRIPTION

Figure 1:
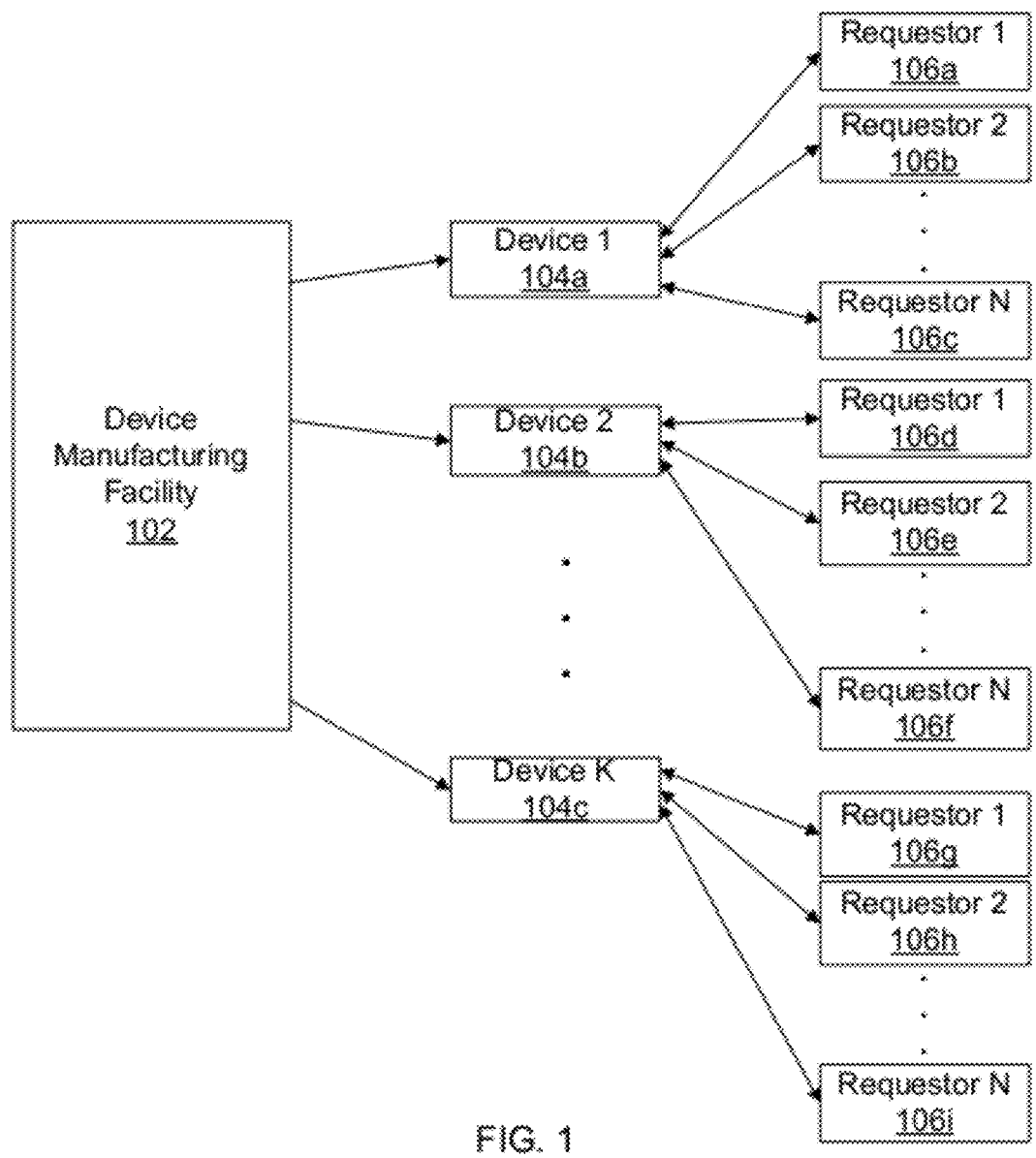
FIG. 1 is a block diagram of an exemplary system within which various exemplary embodiments can be implemented.

Methods, devices, systems and computer program products are provided to facilitate cryptographically secure retrieval of secret information that is embedded in a device. The embedded secret information can include a random number that is not custom-designed for any specific requestor of the secret information. Upon receiving a request for the embedded secret information, an encrypted secret is provided to the requestor that enables the recovery of the embedded secret information by only the requestor. The described techniques can be used to eliminate a need for maintenance of a database of the embedded secret information and the associated requestors.

Some information security systems, such as digital rights management (DRM) systems, require unique secret keys to be embedded in, for example, a chipset as part of the manufacturing process of the chipset. Usually this key is used to enable secure delivery of information to/from the system-on-chip (SoC). Therefore, this key must be known to the party wishing to establish such a channel. At the same time, this key must not be visible in any way outside of the device or be accessible by unauthorized parties. In order to properly utilize and distribute such keys, some systems utilize key management and exchange protocols that require the existence and maintenance of key databases. The maintenance of such databases can increase the cost and complexity of such systems, and can also increase the liability of the party that maintains the database.

The described techniques can be implemented in ways that eliminate the need for maintenance of afore mentioned databases. The disclosed embodiments provide examples for implementing methods, devices, systems and computer program products for facilitating the exchange of secret information that resides in a device, such as a chip, chipset, system-on-chip, and the like. Such secret information is typically embedded in the device at time of manufacturing. Such secret information (or key) may need to be accessed by only a particular authorized party. In some systems, this is achieved by embedding a specific secret value and an identity associated with the requesting party into the SoC at the time of manufacturing of the SoC. To avoid subsequent manipulation of the secret value and/or the identity, the SoC may be equipped with a locking capability that prevents future tempering with the secret key and the identity once written to the device. Such systems, therefore, require that each device to be specifically manufactured for a requesting party which adds complexity to inventory management, ordering and the manufacturing processes. For example, the device manufacturer must know the security provider that is responsible for supplying the secret value and to implement specific inventory maintenance and tracking procedures once the device is manufactured. Moreover, in such systems, the key and/or the identity are stored in a database that must be maintained and managed by the device manufacturer, the requesting party and/or a trusted third party. As a result, the device manufacturers may have the additional burden of securely communicating with such a database and potentially managing at least a portion of the operations associated with the database.

In other systems, database management can be avoided by embedding a random (but visible) identity into the SoC and using a keyed one-way function to create a related secret key. The party with the knowledge of the one-way function and the associated key, knowing the random identity, can readily produce the secret key. Such a system can, for example, be utilized in a challenge-response protocol, where the security system may allow access to the device (or unlock certain test ports of the device) upon challenging a requesting party and, in response, receiving a correct secret key. The security of this system is fully dependent on the secrecy of the one way function, which may be shared among multiple external parties. If each requesting party requires a unique one-way function (e.g., to be assured that another third party has not leaked or maliciously used the one-way function), then each device has to be specifically manufactured for individual requesting parties with their own dedicated one-way functions. However, the implementation of unique one-way functions for each requesting party can increases the cost and complexity of operations at the device manufacturing stage.

The disclosed embodiments enable personalization of secret information that is embedded within a device, such as an SoC, for individual requesting parties without the need for embedding dedicated secret information for each requesting party. The disclosed embodiments further eliminate the need for the management and maintenance of databases of embedded secret information and the corresponding requestor identities at the device manufacturing facilities. In some embodiments a random secret key is written to the device. The device then delivers a derivative of the random secret key securely to multiple external parties, such that each of the external parties can be certain of the integrity of the unique secret, without requiring the device to be manufactured specifically for individual third parties, or requiring database management on the part of the device manufacturer. In some embodiments, the values that are passed into the device (e.g., the SoC), and/or read from the device, by the requestor of embedded secret information are not necessarily secret values, but provide meaningful access information when utilized in combination with other secrets that are held exclusively by the external parties.

FIG. 1 provides a block diagram of a system that can accommodate the disclosed embodiments. The device manufacturing facility 102 that is depicted in FIG. 1 typically produces devices 104a through 104c, e.g., chip, chipset, system-on-chip (SoC), and others, that can be purchased by outside entities, such as OEM manufacturers and system developers. Each of the manufactured devices 104a through 104c is embedded with unique secret information, such a random number. The embedded secret information may then be requested by a number of requestors 106a through 106i. As noted earlier, the embedded secret information may be used by the requestor to, for example, establish a secure communication channel with the device, with other systems or devices, and/or to effect other cryptographically secure operations.

Figure 2:
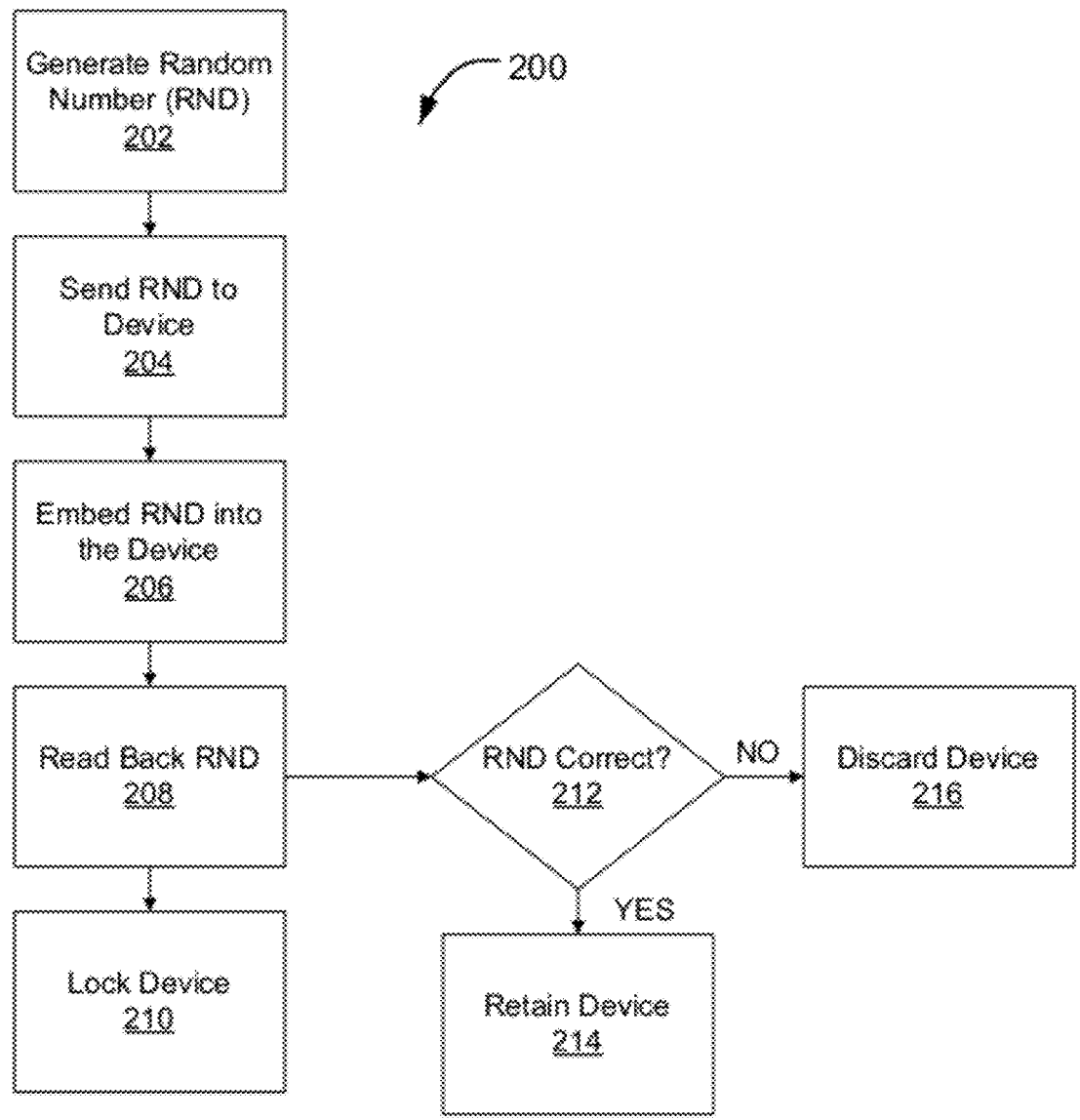
FIG. 2 illustrates a set of operations that are carried out for embedding a random number in a device in accordance with an exemplary embodiment.

FIG. 2 illustrates a set of operations that can be carried out for embedding a random number in a device in accordance with an exemplary embodiment. Some or all of the operations 200 that are illustrated in FIG. 2 can be carried out at, for example, a device manufacturing facility. At 202 a random number (RND) is generated and, at 204, the generated random number is sent to the device. The device can, for example, comprise an SoC. In some embodiments, the random number may be generated at the device. However, the generation of truly random numbers for cryptography applications (i.e., cryptographically secure random numbers) may require operations that are time consuming and/or can be more readily conduced outside of the device, or perhaps outside of the manufacturing facility. For example, the generation of random numbers from thermal noise may require the operation of a thermal source for a particular period of time before suitable values can be generated. As such, in some embodiments, random numbers are generated prior to the embedding of numbers in the device, and perhaps outside of the manufacturing facility, using proper random number generation schemes. The generated random numbers are then transmitted to and/or stored at the manufacturing facility for later use during the device manufacturing process. It should be further noted that, in addition to the embedded random number, an arbitrary identity associated the device may also be generated and written to each device. In some embodiments, such an identity is readable as plaintext by a requester that is accessing the device, whereas the embedded random number (as will be described in the sections that follow) is only securely communicated to particular requestors.

Next at 206, the random number is embedded in the device. For example, the random number may be written to a particular register or memory location within the device. At 208, the random value that was embedded in the device is read back and, at 210, the location within the device that contains the random value is locked. Locking of the device prevents future manipulations of the embedded random number. In one example embodiment, the device comprises a one-time programmable (OTP) component, such as a non-volatile on-chip memory location, that is used for permanently storing the random number within the device. At 212, a process is performed to determine whether or not the random number was correctly embedded into the device. If the correct random number cannot be retrieved at 212, the device may be discarded at 216. However, if the random number is correctly embedded, the device is retained at 214.

A device that is embedded with a random number through, for example, the exemplary set of operations of FIG. 2, may also contain a set of asymmetric keys associated with a public key encryption algorithm. In some implementations, the stored keys may include both a public key and a private key. The public key may be stored in the device to prevent changing of the public key and allow ready access to the key. The private key that is contained within the device is kept secret. For example, one or more RSA public key pairs can be stored in the device. Stored public keys may be owned by the manufacturer of the device or by multiple third parties.

Figure 3:
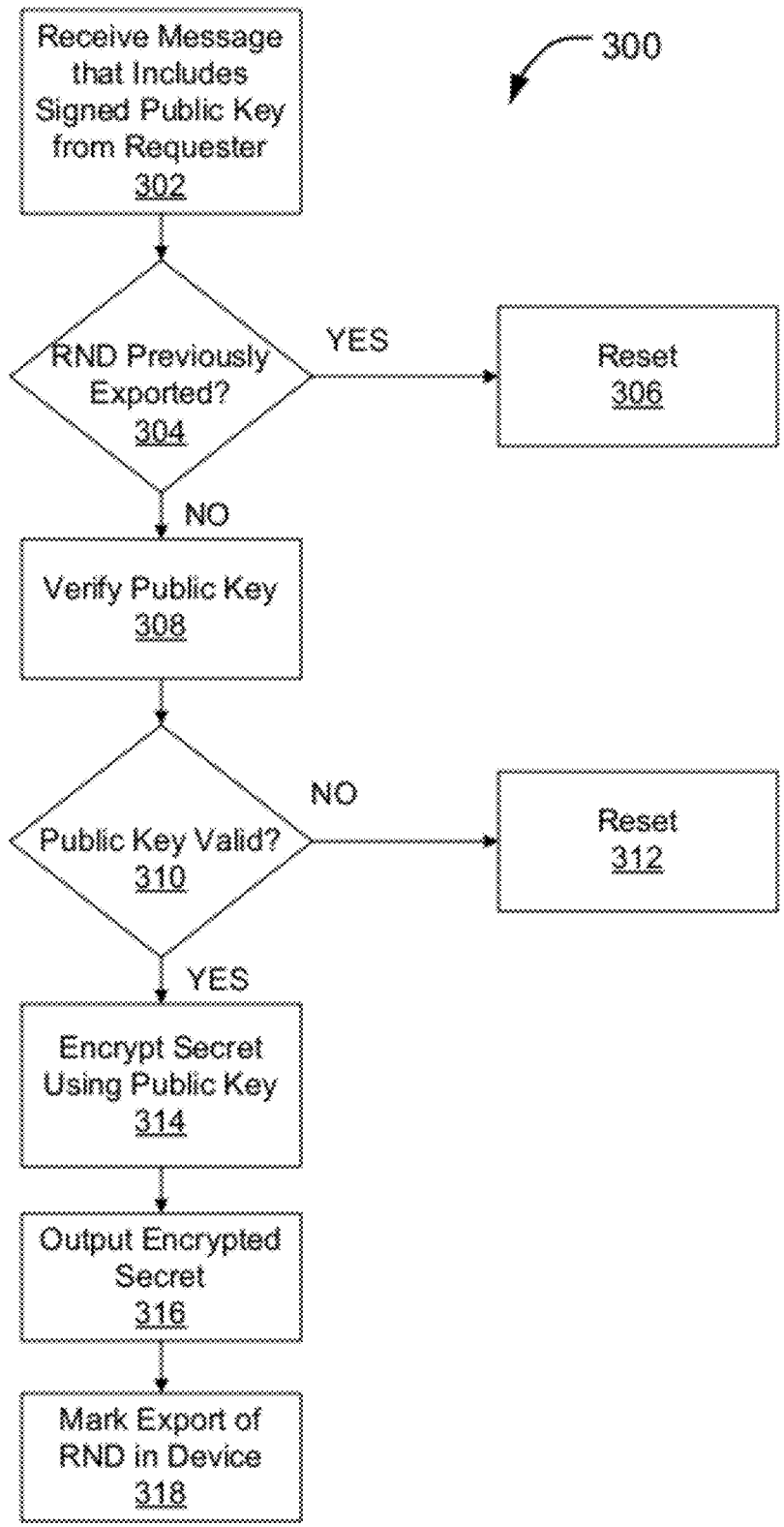
FIG. 3 illustrates a set of operations that are carried out to securely provide secret information associated with a device in accordance with an exemplary embodiment.

FIG. 3 illustrates a set of operations 300 that can be carried out to securely provide secret information associated with a device in accordance with an exemplary embodiment. The exemplary operations 300 of FIG. 3 may, for example, be carried out by one or more components of the device that comprise a security system outside of the device manufacturing facility. At 302, a message that includes a signed public key from a requestor of the embedded secret information is received. In one example, the public key that is received at 302 is signed using one of the RSA public keys that correspond to the device (e.g., correspond to the device manufacturer). As such, an OTP may be used to select which of the stored public keys is used to verify the received public key of the requestor. At 304, a process is performed to determine whether the secret information was previously exported. If the information was previously exported ("YES"), a reset operation is performed at 306 and the process stops. In one example, a processor or circuit that is configured to control some or all of the operations 300 of FIG. 3 can assert a hardware reset signal, causing the SoC to reset and restart. If, on the other hand, the determination at 304 is a "NO," the operations continue by verifying the public key of the requestor at 308. In some embodiments, the verification at 308 includes an RSA verification operation on the message and the associated signature that was received at 302. For example, the verification operations at 308 can be carried using the RSA Probabilistic Signature Scheme (RSA-PSS). In another example, the verification at 308 can be carried out using Elliptic Curve Digital Signature Algorithm (ECDSA). In some embodiments, the verification operations at 308 includes an error correction code (ECC) verification operation. If the public key cannot be verified, a reset operation is performed at 312 and the process stops. For example, a processor or circuit that is configured to control some or all of the operations 300 of FIG. 3 can assert a hardware reset signal, causing the SoC to reset and restart. If, on the other hand, the public key of the requestor is properly verified, then, at 314, the embedded secret information is encrypted using the public key of the requestor. At 316, the encrypted embedded secret information and potentially the arbitrary identity of the device are outputted. In addition, the device may be marked to indicate that the embedded secret information has been exported to the particular requestor. This is the operation at 318 and can be carried out by, for example, burning a fuse and/or writing to an OTP.

The requestor of the embedded secret information, upon receiving the encrypted message, can use its private key to readily decrypt the received message and recover the RND value. The requestor can optionally store the RND and the associated identity at a safe location (e.g., a key database).

However, there is no need for the device manufacturer to maintain or interact with such a database. The exemplary embodiment that is illustrated with the aid of FIG. 3, therefore, provides a procedure for providing the embedded secret information to any particular requesting party, without the need to manufacture a custom device for that particular party. Moreover, the exemplary embodiment that is illustrated in FIG. 3 eliminates a need for managing and maintaining a database of keys and related information by the device manufacturer.

In some implementations, the message that is received from a particular requestor (e.g., operation 302 in FIG. 3) includes not only a singed public key of the requester but also one or more auxiliary pieces of information, such as one or more usage flags. For example, such a usage flag can indicate that a particular operation, such as retrieval of the embedded secret information, is requested. The usage flags can be verified, as, for example, part of operation 310 of FIG. 3, and subsequently be read and interpreted by the security system before carrying out subsequent operations, such as encryption of the secret.

Figure 4:
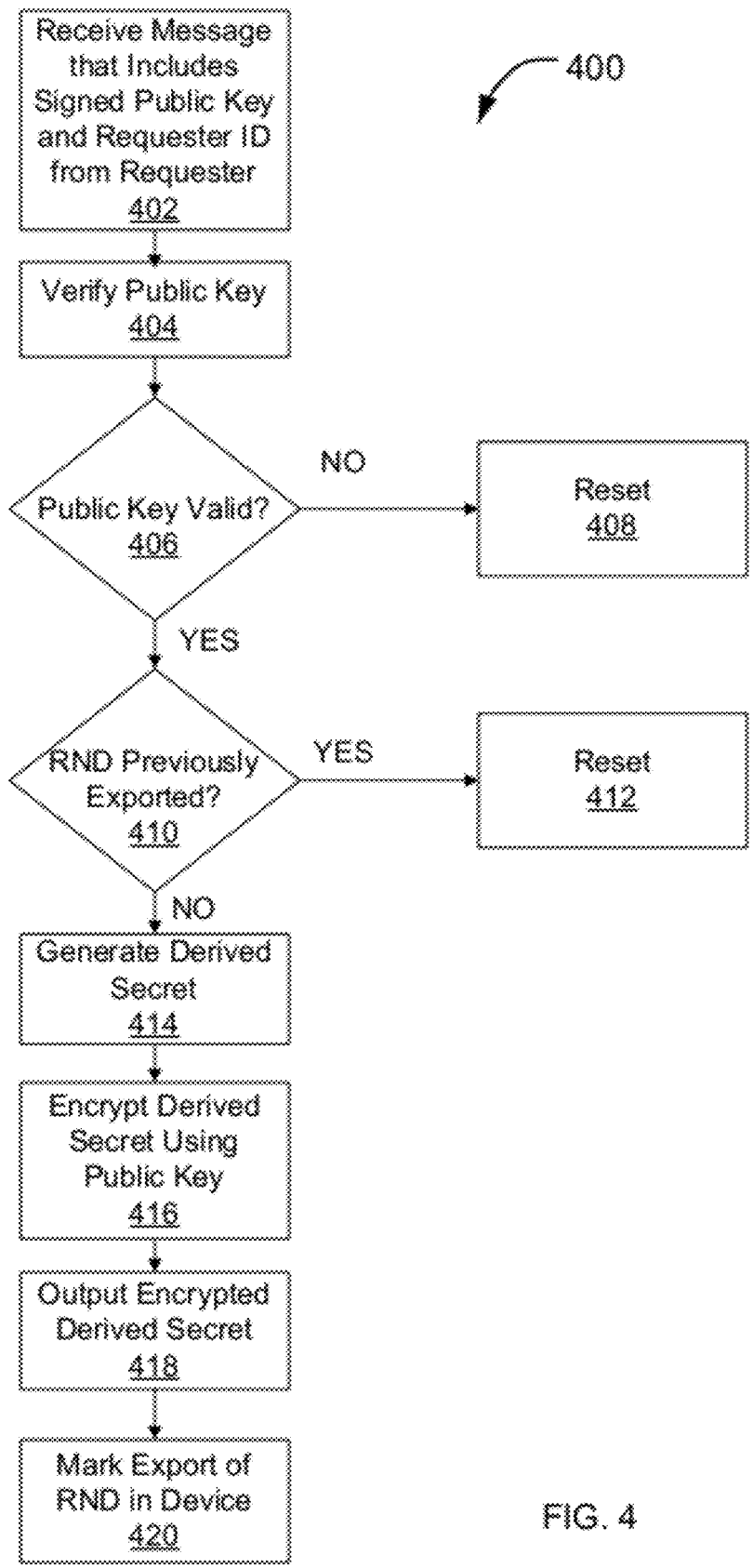
FIG. 4 illustrates a set of operations that are carried out to securely provide secret information associated with a device in accordance with another exemplary embodiment.

FIG. 4 illustrates a set of operations 400 that can be carried out to securely provide secret information associated with a device in accordance with an exemplary embodiment. The exemplary operations 400 of FIG. 4 may, for example, be carried out by one or more components of the device that comprise a security system outside of the device manufacturing facility. At 402, a message that includes signed public key, along with the requester identification, is received from a requestor. In one example embodiment, the public key that is received at 302 is signed using one of the RSA public keys that correspond to the device (e.g., correspond to the device manufacturer). The requester identification is an example of auxiliary information that can be passed to the device from the requestor. In the example embodiment that is illustrated in FIG. 4, the requester identification identifies an owner, a requestor, or another party interested in obtaining the embedded secret information. In one example, the requester identification is a binary field.

Next at 404, the public key is verified. At 406, a determination is made on whether the public key is valid. If the public key cannot be verified ("NO" at 406), a reset operation is performed at 408 and the process stops. If the public key is valid, a process is performed at 410 to determine whether the embedded secret information was previously exported to the particular requestor. If the information was previously exported ("YES" at 410), a reset operation is performed at 412 and the process stops. If, on the other hand, the determination at 410 results in a "NO," the operations 400 continue at 414, where a derived secret is generated using the requester identification and the embedded secret information. In one example embodiment, the derived secret is generated by encrypting the requester identification using the embedded secret information (e.g., RND). In some implementations, Advanced Encryption Standard (AES) or other symmetric-key encryption algorithms, can be used to encrypt the requestor identification. In some embodiments, the secret information (e.g., RND) is used as the key for the encryption algorithm, the requestor ID is the plaintext, and the requestor ID is encrypted to produce a ciphertext that is the requestor-specific secret. At 416, the derived secret is encrypted using the public key of the requestor, and, at 418, the encrypted derived secret is outputted. At 420, the device is marked to indicate that the embedded secret information has been exported to the particular requestor. This way, the determination at 410 to assess whether or not the RND has been previously exported can be facilitated when another request is received by the device. The operation at 420 can be carried out, by for example, burning a fuse and/or writing to an OTP.

Based on the above operations 400 in FIG. 4, the requester can then decrypt the received derived secret, and determine the embedded secret information. The operations 400 in FIG. 4 thus enable the generation of a unique derived secret for each requestor from the embedded secret information using the auxiliary information (e.g., the requester ID). As such, the device that is configured to operate in such a way can provide the embedded secret information to multiple requestors using cryptographically secure messages. The secure message that is sent to each requestor is unique and cannot be deciphered by any other requestor without having the appropriate decryption keys. This design would allow potentially an unlimited number of requestors to query the device and receive the embedded secret information in such a way that is cryptographically isolated from messages that are sent to other requestors.

It should be noted that the exemplary set of operations that are illustrated in FIG. 4 restrict multiple exports of the secret information to the same party. In some embodiments, however, such a restriction may not be present. For example, the embedded secret can be conveyed to the same party (e.g., to the same requestor ID) multiple number of times. In such embodiments, each export of the embedded secret information may be separately recorded into the device, or otherwise documented.

Figure 5:
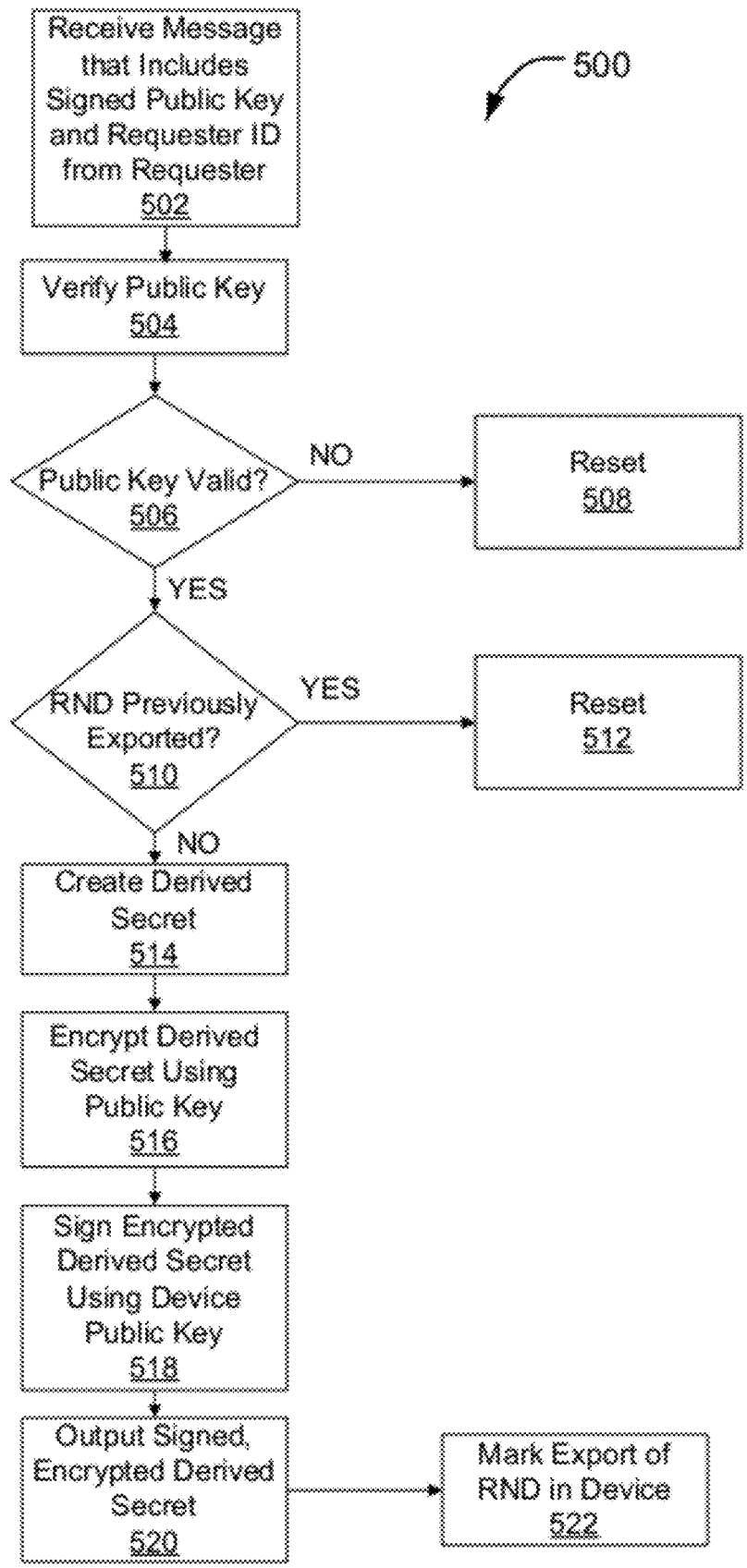
FIG. 5 illustrates a set of operations that are carried out to securely provide secret information associated with a device in accordance with another exemplary embodiment.

FIG. 5 illustrates another set of operations 500 that can be carried out to securely provide secret information associated with a device in accordance with an exemplary embodiment. The exemplary operations 500 of FIG. 5 may, for example, be carried out by one or more components of the device that comprise a security system outside of the device manufacturing facility. Operations 502 to 516 are similar to those described in connection with operations 402 to 416 of FIG. 4, respectively. Specifically, at 502, a message that includes a signed public key and a requester ID is received from a requestor. Next, the public key is verified at 504, and if the determination at 506 indicates that the public key is not valid, a reset operation at 508 is initiated. If the determination at 506 indicates a valid public key, the operations 500 continue at 510 to determine if the secret information has not been previously exported to the requesting entity. If the determination at 510 indicates that the secret had been previously exported, a reset operation is carried out at 512. If, on the other hand, the secret information has not been previously exported ("NO" at 510), a derived secret is created, at 514, using the requester ID and the secret embedded information.

At 516, the derived secret is encrypted. At 518, the encrypted derived secret is further signed. In some examples, the signing of the encrypted derived secret is carried out using a global (i.e. a single) private key of the requestor, whereas in other examples, a device-specific private key is used to sign the encrypted derived secret at 518. In example embodiments that utilize device-specific keys, a list of associated valid public keys is generated. Such a list can, for example, be generated as part of the device manufacturing operations and made publicly available. The list of public keys that is made available to the requester of the secret information enables the requester to confirm that the exported secret was provided by a legitimate device. At 520, the signed and encrypted derived secret is outputted. At 522, the device is marked to indicate that the embedded secret information has been exported to the particular requestor.

The operations 500 that are illustrated in FIG. 5 include the additional operation 518 of signing the encrypted derived secret. Such a signed message, once received and verified by a requestor of the secret information, provides assurances as to the authenticity of the message that is produced by the device. In particular, such a signature ensures that the message is truly generated by a legitimate security system (or security company) rather than from an attacker who is intercepting the communications from the requestor and merely emulating responses from a legitimate security system.

Figure 6:
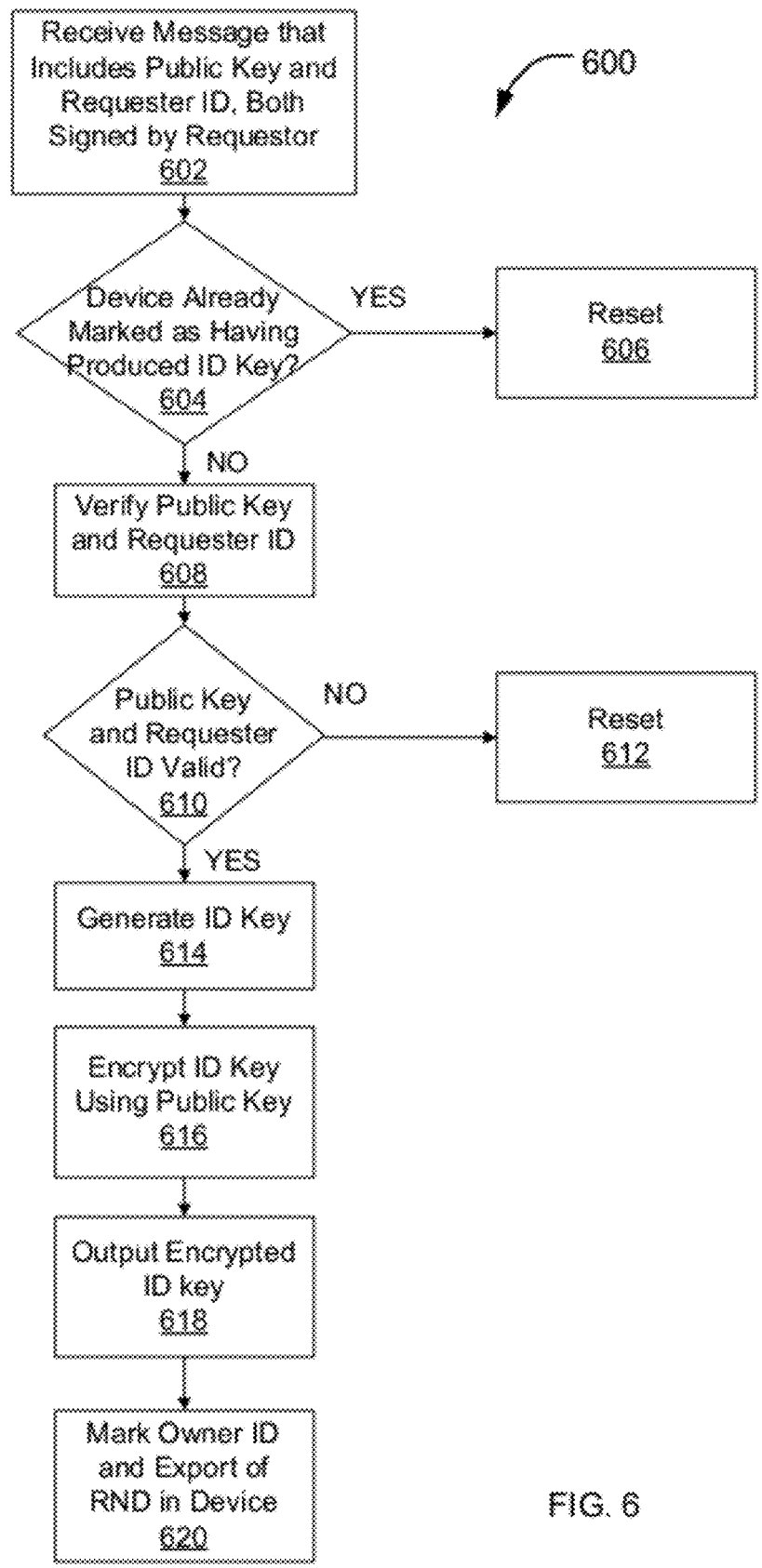
FIG. 6 illustrates a set of operations that are carried out to securely provide secret information associated with a device in accordance with another exemplary embodiment.

FIG. 6 illustrates another set of operations 600 that can be carried out to securely provide secret information associated with a device in accordance with an exemplary embodiment. The exemplary operations 600 of FIG. 6 may, for example, be carried out by one or more components of the device that comprise a security system outside of the device manufacturing facility. At 602, a message that includes signed public key along with a signed requestor-generated identification ("requestor ID") is received from a requestor. In one example embodiment, the signing of the public key and the requestor ID is carried out using one of the RSA public keys that correspond to the device (e.g., correspond to the device manufacturer). In some embodiments, the received public key and the requestor ID may be signed as separate messages, while in other embodiments, the public key and the requestor ID may form a single message that is signed and transmitted to the device by the requestor.

Next at 604, a process is performed to determine if the device has already been marked as having produced an ID key (e.g., if device OTP already contains an ID). If the device has already been marked with having produced an ID key ("YES" at 604), a reset operation is performed at 606 and the process stops. If device has not previously produced an ID key (e.g., the OTP is blank) ("NO" at 604), the public key and the requestor ID are verified at 608. If the verification of either the public key or the requestor ID fails ("NO" at 610), a reset operation is performed at 612 and the process stops. Otherwise, an ID key is generated at 614. In one example, the ID key is generated by encrypting the requestor ID with the secret embedded information. At 616, the ID key is encrypted using public key of the requestor and, at 618, the encrypted ID key is outputted. At 620, the requestor ID and an indication of the export of the secret information are recorded in the device.

Once the encrypted message that is generated by the device is received by the requestor, the requestor, using its private key, can decrypt the received message and recover the ID key. The ID key, along with the requestor ID (which is known to the requestor), can be stored by the requestor. The set of exemplary operations 600 that are illustrated in FIG. 6, therefore, produce a derived secret (i.e., the ID key) that is unique to each requestor and is produced based on a particular token (e.g., the requestor ID) that is securely passed to the device by the requestor. One of the advantages of the exemplary operations 600 of FIG. 6 is that malicious attempts to obtain information can be thwarted. In particular, in one attack scenario, a malicious party may initiate a request for the ID key of the device, receive the ID key, and somehow prevent the device from marking the export of the ID key (e.g., the malicious party blocks the OTP write). Such a device may then be available to legitimate users for real authorization. Upon receiving a request from a legitimate user, the device provides an ID key based on the set of exemplary operations 600 that described in FIG. 6. As the ID used by the legitimate user is almost certainly different from the ID used by the malicious party, the malicious requestor would not receive any information from the device. Since the requestor ID and the factory programmed identity can remain secrets, even if a malicious third party could manage to obtain subsequent output messages from the device, such messages include a different requestor identity than the one provided by the legitimate user. Since malicious third parties do not know the unique ID for this device, they would not be able to receive the ID key corresponding to the legitimate request. Another advantage of the exemplary operations 600 of FIG. 6 is that the need for embedding an arbitrary chip identity during the manufacturing process is eliminated since the requestor-provided identity can adequately serve as the chip identity.

It should be noted that similar to the exemplary embodiments described in connection with FIG. 3, the received message at 602 can also include one or more auxiliary information or usage flags that allow only particular subsequent operations. Such usage flags may be embedded in the device (e.g., written to the OTP) and used as part of the secret-generation procedure. For instance, in order for the device to generate the same secret at a later point in time, the same usage flags are provided to the device during runtime. As such, the original message will cause the chip to generate a secret that can only be subsequently used in the way that the requestor intended. If the usage flags are changed at runtime, i.e. the device is requested to generate the secret key with a different set of flags, then the generated key will not match the previously generated key and flag values.

Moreover, in some embodiments, the received message at 602 further comprises an owner ID (which is not a secret) that is used, similar to the operations 400 of FIG. 4, to generate an owner-specific derived secret. In such embodiments, the requestor provides both a requestor-generated ID as well as the owner ID. In still other embodiments, in addition to encrypting the key ID (at 616), the device, similar to operation 518 of FIG. 5, signs the encrypted ID key using the device public key, thereby providing assurances that the output message is generated by a legitimate device (or security system).

In some embodiments, multiple derived secrets can be produced. In particular, N OTPs can be configured to allow requests by N requestors. For example, if three eight requestors need derived secrets, the SoC can be configured to set aside eight OTP bits. In such embodiments, bit i $\{1 \leq i \leq N\}$ of the OTP is set (and locked) if the public owner ID flag that is received by the SoC includes a value i. As described earlier in connection with FIG. 4, the owner ID, i, can also then be used to generate the derived secret, thereby allowing the generation of the derived secret associated with requester i only once. In some embodiments, even if a device is configured with the capability to provide derived secrets for N requestors, the security system may decide to provide derived secrets for less than N users. In such scenarios, some of the OTP bits may be locked without even outputting the derived secrets. This mechanism enables the reduction of the number of requestors that can be accommodated by the device after the device has been manufactured.

It should be noted that the various exemplary operations that are illustrated in FIGS. 2-6 are described in a particular sequence in order to facilitate the understanding of the disclosed embodiments. It is understood, however, that one or more of the operations that are illustrated in each of FIGS. 2-6 may be eliminated and/or combined with other operations. Further, one or more of the operations that are illustrated in each of FIGS. 2-6 may be carried out in a different order than illustrated.

It is further understood that the foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. For instance, in some embodiments, configuration values may be used instead of identities to generate the derived secret. In other embodiments, multiple configuration values may be stored to allow more than one derived or effective secret to be generated. In yet other embodiments, a usage configuration which is signed with the input public key may be linked to the effective secret generation process.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Bluray discs, etc. Therefore, the computer-readable media that are described in the present application comprise non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 7:
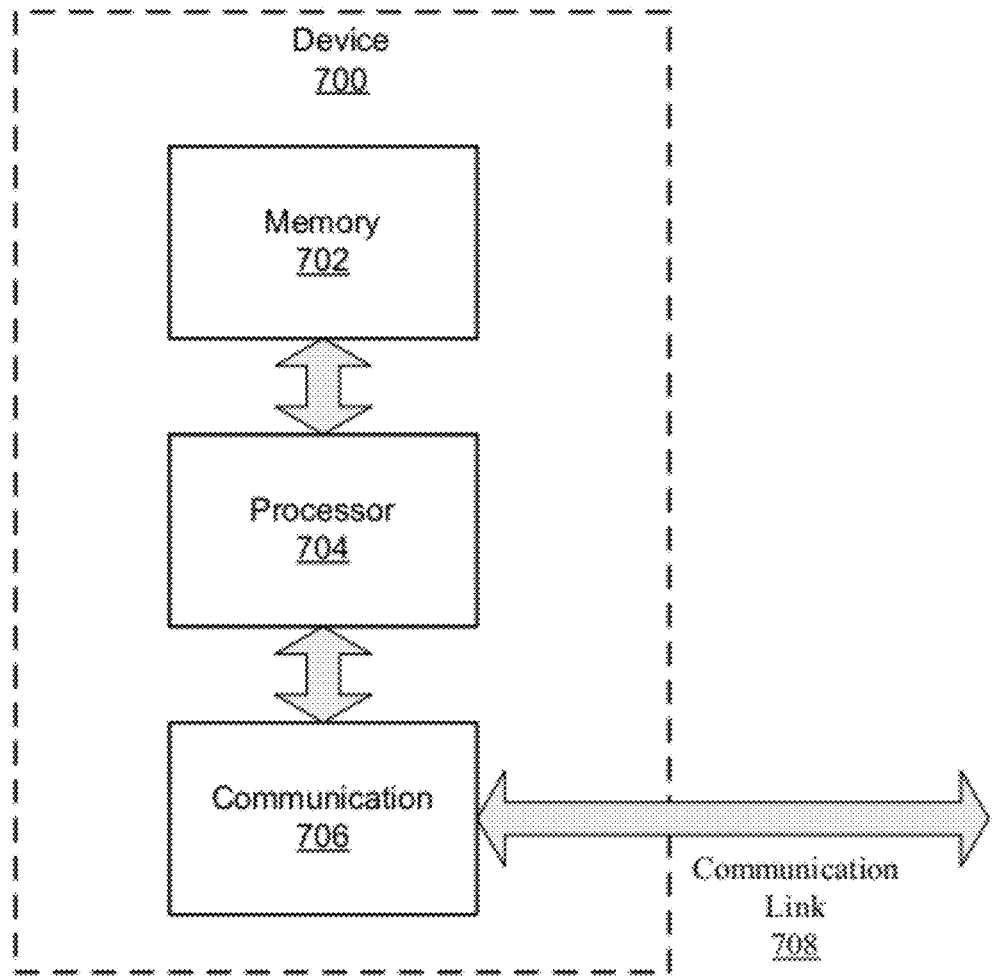
FIG. 7 is a block diagram of exemplary device that can accommodate the disclosed exemplary embodiments.

It is understood that the various embodiments of the present application may be implemented individually, or collectively, in devices comprised of various hardware and/or software modules and components. These devices, for example, may comprise a processor, a memory unit and an interface that are communicatively connected to each other. For example, FIG. 7 illustrates a block diagram of a device 700 within which all or a portion of the various embodiments of the present application may be implemented. The device 700 comprises at least one processor 704 and/or controller, at least one memory 702 unit that is in communication with the processor 704, and at least one communication unit 706 that enables the exchange of data and information, directly or indirectly, through the communication link 708 with other entities, devices and networks. The communication unit 706 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The memory 702 may store data, instructions and other types of information, and may comprise both read-only memory (ROM) and random access memory (RAM). A portion of the memory 702 may include non-volatile random access memory (NVRAM). Moreover, a one-time programmable (OTP) device may be implemented as part of memory 702. The OTP device can also be implemented as a separate component within the device 700.

The exemplary device 700 of FIG. 7 may be used to implement the exemplary embodiments of the present application. One such exemplary embodiment relates to a method that includes receiving a first message from a first requestor of secret information that is embedded in the device. Such a message comprises a public key associated with the first requester. Further, the embedded secret information comprises random information that is not associated with any particular requestor. This exemplary method further includes generating a first encrypted secret based on the received public key and the embedded secret information.

In one embodiment, the public key is signed by the first requestor using a key associated with the device. In another embodiment, the generation of the first encrypted secret is carried out without maintaining a database of embedded secret information. According to another embodiment, the above noted method further includes verifying the received public key, where the first encrypted secret is generated only if verification of the received public key is successful. In another embodiment, the above noted method also includes marking the device to designate the generation of the first encrypted secret. The marking can include, for example, locking a one-time programmable (OTP) device.

According to another embodiment, the first encrypted secret is generated only if the device is not marked with an indication that the first encrypted secret has been previously generated. In some embodiments, the first encrypted secret is generated by encrypting the embedded secret information using the received public key. Still in other exemplary embodiments, the device further comprises an identity that is embedded in the device. Such an embedded identity can be provided to the first requestor along with the first encrypted secret.

In another exemplary embodiment, the first message includes auxiliary information indicative of the first requestor's identification. In this exemplary embodiment, the first encrypted secret is generated by encrypting the auxiliary information indicative of the first requestor's identification using the embedded secret information, and then encrypting the result using the first requestor's received public key.

The disclosed embodiments can also accommodate multiple requestors of the embedded secret information. In particular, in one exemplary embodiment, the above noted method further includes receiving a second message from a second requestor of embedded secret information, where the second message comprises auxiliary information indicative of the second requestor's identification. In such a scenario, the method also includes generating a second encrypted secret by encrypting the auxiliary information indicative of the second requestor's identification using the embedded secret information, and then encrypting the result using the second requestor's received public key.

According to another embodiment, the above noted method further includes digitally signing the first encrypted secret. In another embodiment, the first message comprises both a signed public key and a signed requester identity associated with the first requester. In this embodiment, the first encrypted secret is generated by encrypting the received identity associated with the first user using the embedded secret information, and then encrypting the result using the first requestor's received public key. In a related scenario, the method of the exemplary embodiment further includes receiving a second message from a second requestor of embedded secret information, where the second message comprises both a signed public key and a signed requester identity associated with the second requester. In this scenario, the method also includes generating a second encrypted secret by encrypting the received identity associated with the second requestor using the embedded secret information, and then encrypting the result using the second requestor's received public key.

In another embodiment, the embedded secret information includes a random number that is embedded within the device as part of a manufacturing process of the device. For example, the random number can be a cryptographically secure random number that is generated outside of the device. In another example, the device comprises a system-on-chip (SoC) device. In still another embodiment, the embedded secret information is recoverable by decrypting the encrypted secret with a private key associated with the received public key of the first requestor.

In yet another embodiment, the first message that is received from the first requestor comprises one or more usage flags indicative of one or more operations of the device. In one embodiment, the above noted method further comprises marking the device with the one or more usage flags that were included in the first message. In one example, the one or more usage flags that are marked within the device are subsequently used to control access to the device.

Another aspect of the disclosed embodiments relates to a device that includes a processor and a memory. The memory includes processor executable code such that the processor executable code when executed by the processor configures to device to receive a first message from a first requestor of secret information that is embedded in the device. The message includes a public key associated with the first requester and the embedded secret information comprises random information that is not associated with any particular requestor. The processor executable code when executed by the processor further configures to device to generate a first encrypted secret based on the received public key and the embedded secret information.

Another aspect of the disclosed embodiments relates to a computer program product that is embodied on a non-transitory computer readable media. The computer program product includes computer code for receiving a first message from a first requestor of secret information that is embedded in a device. The message comprises a public key associated with the first requester and the embedded secret information comprises random information that is not associated with any particular requestor. The computer program product also includes computer code for generating a first encrypted secret based on the received public key and the embedded secret information.

Another exemplary embodiment relates to a method that comprises receiving a request for retrieval of secret information associated with a device, where the secret information is not associated with any particular requestor of the secret information. This method further includes generating a cryptographically secure response that enables a receiver of the response to recover the embedded secret information. The embedded secret information is, however, only recoverable by the sender of the request.

In still another exemplary embodiment a method is provided that includes transmitting a message to a device to request secret information that is embedded within the device. The transmitted message includes a public key and the embedded secret information comprises random information that is not associated with any particular requestor of the embedded secret information. This method also includes receiving an encrypted secret in response to the transmitted message, and recovering the embedded secret from the encrypted secret.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method in a device for securely exporting key material to a requesting device, comprising:
   receiving, at the device, a message from a first requestor for key material for the device, wherein the message includes a public key associated with the first requester and a digital signature of the public key associated with the first requestor generated using a public key associated with the device;
   determining whether the requested key material has been previously exported to the first requestor;
   when the requested key material has not been previously exported to the first requestor:
   generating the key material using secret information for the device; and
   exporting the key material to the first requestor.

2. The method of claim 1, wherein:
   the device further comprises a device identifier; and
   the device identifier is provided to the first requestor with the key material.

3. The method of claim 1, wherein
   the message further includes an identifier of the first requestor; and
   the key material is generated by encrypting the identifier of the first requestor using the secret information, and then encrypting the result of the encryption of the identifier of the first requestor using the received public key.

4. The method of claim 3, further comprising:
   receiving a second message from a second requestor for key material for the device, wherein the second message includes an identifier for the second requester; and
   generating a second key material by encrypting the identifier for the second requestor using the secret information, and then encrypting the result of the encryption of the identifier for the second requestor using the second requestor's received public key.

5. The method of claim 1, further comprising digitally signing the key material using the private key of the device.

6. The method of claim 1, wherein the secret information comprises a random number that is embedded within the device as part of a manufacturing process of the device.

7. The method of claim 6, wherein the random number is a cryptographically secure random number that is generated outside of the device.

8. The method of claim 1, wherein the message comprises a usage flag indicative of a particular operation of the device.

9. The method of claim 8, further comprising:
   storing the received usage flag:
   using the stored usage flag to control access to the device by the first requestor.

10. The method of claim 1, further comprising:
    storing a private key associated with the device, wherein the private key is related to the public key of the device.

11. The method of claim 10, further comprising verifying the digital signature using the private key of the device, wherein the key material is generated only if verification of the received digital signature is successful.

12. The method of claim 1, further comprising:
storing an indication that the key material was exported to the first requestor after the key material is exported to the first requestor.

13. The method of claim 1, further comprising:
storing the secret information in the device.

14. The method of claim 13, further comprising:
programming a one-time programmable memory in the device with the secret information.

15. The method of 13, wherein the key material is generated by encrypting the secret information using the received public key.

16. A device for securely exporting key material to a requesting device, comprising:
a processor configured to:
receive a message from a first requestor for key material for the device, wherein the message includes a public key associated with the first requester and a digital signature of the public key associated with the first requestor generated using a public key associated with the device,
determine whether the requested key material has been previously exported to the first requestor,
when the requested key material has not been previously exported to the first requestor:
generate the key material using secret information for the device, and
export the key material to the first requestor; and
a memory configured to store the secret information and a private key for the device.

17. The device of claim 16, wherein the processor is further configured to generate the key material by encrypting the secret information using the received public key.

18. The device of claim 16, wherein the memory is further configured to store a device identifier.

* * * * *